United States Patent [19]

Rubner

[11] Patent Number: 5,275,377
[45] Date of Patent: Jan. 4, 1994

[54] VALVE DISKS OF SILICON-INFILTRATED SILICON CARBIDE

[75] Inventor: Klaus Rubner, Lauf, Fed. Rep. of Germany

[73] Assignee: Hoechst CeramTec Aktiengesellschaft, Selb, Fed. Rep. of Germany

[21] Appl. No.: 46,814

[22] Filed: Apr. 16, 1993

[30] Foreign Application Priority Data

Apr. 17, 1992 [DE] Fed. Rep. of Germany ....... 4212874

[51] Int. Cl.$^5$ .............................................. F16L 5/00
[52] U.S. Cl. ............................... 251/368; 137/625.41; 137/15
[58] Field of Search .................... 251/368; 137/625.17, 137/625.41, 15

[56] References Cited

U.S. PATENT DOCUMENTS

| | | | |
|---|---|---|---|
| 3,533,444 | 10/1970 | Lyon | 137/625.17 |
| 3,736,959 | 6/1973 | Parkison | 137/625.17 |
| 3,837,356 | 9/1974 | Selep et al. | 251/368 |
| 4,327,758 | 5/1982 | Uhlmann | 137/625.41 |
| 4,337,920 | 7/1982 | Parris | 251/368 |
| 4,856,758 | 8/1989 | Knapp | 251/368 |

FOREIGN PATENT DOCUMENTS

| | | |
|---|---|---|
| 3116786 | 11/1982 | Fed. Rep. of Germany . |
| 3116801 | 11/1982 | Fed. Rep. of Germany . |
| 67746/82 | 6/1982 | Italy . |

*Primary Examiner*—A. Michael Chambers
*Attorney, Agent, or Firm*—Foley & Lardner

[57] ABSTRACT

A valve disk of silicon-infiltrated silicon carbide material for control elements for regulating liquid flows is suitable in particular for service-water mixer valves. The silicon carbide material contains 70 to 90% by weight of silicon carbide and 8 to 30% by weight of silicon with a content of most 0.2%, by weight of free carbon and contains at most 0.1% by volume of closed pores. The valve disk has a functional surface having the optical appearance in the form of isolated islands of bearing surfaces surrounded by a level lying lever with respect to the isolated islands, the functional surface having the following microtopographical characteristics over its entire region: $R_a$: 0.02 to 0.80 $\mu$m, preferably 0.15 to 0.40 $\mu$m; $R_t$: 0.50 to 6.00 $\mu$m,; $R_z$: 0.20 to 100 $\mu$m: flatness: 0.0002 to 0.01 mm; $t_{pi}$: 40 to 80% (at 0.3 $\mu$m cut depth); $t_{pa}$: 10 to 60% (at 0.3 $\mu$m cut depth). The invention also relates to a process for producing the valve disk.

7 Claims, No Drawings

VALVE DISKS OF SILICON-INFILTRATED SILICON CARBIDE

Valve disks for open-loop and closed-loop control purposes, in particular for water fittings in the utility sector, have, in a known manner, for a relatively long time been made of ceramic materials such as, for example, aluminum oxide, zirconium oxide and also of silicon carbide. German Patent No. 31 16 801 describes valve disks composed entirely of silicon carbide material which has a maximum pore content of 0.1% by volume, comprises 70–92% by weight of silicon carbide and contains 8–30% by weight of metallic silicon. The process for producing materials of this kind is disclosed in German Patent No. 31 16 786.

Italian Patent No. 67 746 A/82 describes the use of silicon carbide materials of different hardness for the valve disk pair and ascertains that the disk with the greater hardness should have the lower surface roughness and the disk with the lesser hardness should have the higher surface roughness, without disclosing to a person skilled in the art in detail, in a quantifiable manner, which numerical roughness values for the various surface profile parameters such as $R_1$, $R_t$, $R_z$ he should aim for. In U.S. Pat. No. 4,856,758 the difference in hardness of the two valve disks is specified in greater detail and it is ascertained that it should be at least 1000 $N/mm^2$ and at most 7000 $N/mm^2$.

It is known that the hardness measurement of matrix materials is very difficult and reliably reproducible measurement data presuppose a sure command of microhardness measurement, for which purpose a great deal of laboratory expenditure is always necessary. In addition, for the manufacturing process it is very difficult and complex to produce two materials which are different in their structure, that is to say in their hardness, simultaneously, in particular because the hardness difference must remain in the relatively narrow limits of between 1000 and 7000 $N/mm^2$.

In the abovementioned Italian patent application, the surface quality of the valve disks is quoted as generally being in the range 0.2 to 0.4 $\mu m$, without it being stated which profile parameter $R_a$, $R_t$ or $R_z$ is concerned. In the German Patent No. 31 16 801, a $R_a$ value in the range 0.1 to 0.15 $\mu m$ is quoted.

The main functional task of the valve disks is to maintain the tightness of the open-loop and closed-loop control valves such as, for example, water fittings, in long-term service. In addition to maintaining their sealing effect, however, they must not substantially increase the forces or torques to be applied for their operation. The danger of this results from corrosive effects of the media flowing in the valve, from deposits resulting therefrom or from contaminants carried by them, the hardness of which can match the hardness of the valve disk material. In order to meet these technical requirements, in the prior art especially corrosion-resistant, chemically resistant and hard materials, preferably ceramic hard materials, paired with the same material or in an appropriate material combination are used for valve disks. The person skilled in the art knows that for a given pressure of the disks, the magnitude of the force (torque) required for operation depends very decisively on the quality of the surface and that, in particular as regards the abovementioned long-term constancy of the operating force, the surface quality must not deteriorate. He assesses the quality of the valve disk surface by the technically customary parameters peak-to-valley height $R_t$, mean roughness index $R_a$ and proportion of bearing surface $t_{pi}$. In the prior art as described above, the person skilled in the art requires low numerical values 0.1–0.15 $\mu m$ to 0.2–0.4 $\mu m$ for $R_a$.

In detailed investigations, it was ascertained that, although the quantitatively prescribed numerical values for $R_a$, $R_t$ and $t_{pi}$ are maintained, it is not possible precisely to maintain operating forces of equal magnitude for a series of disk pairs. In the practical case, there is thus a distinct scattering of the operating forces of the individual disk pairs.

The analysis of the problem showed that, although the prescribed quantitative values of $R_a$, $R_t$ and $t_{pi}$ are maintained, the microprofiles of the valve disk surface deviate considerably from one another. That is to say in other words that the figures for the parameters $R_a$, $R_t$ and $t_{pi}$ cannot alone guarantee that the functional requirement is met.

It is therefore the object of the present invention to optimize, in addition to the profile parameters $R_t$, $R_a$ and $t_{pi}$ used hitherto by a person skilled in the art, the features of the valve disk surfaces actually determining their function, that is to say the entirety of their microtopographical parameters. In addition, also for reasons of economy, only one material may be used for valve disks in manufacture.

The aforementioned object was achieved by a valve disk of silicon-infiltrated silicon carbide for open-loop control elements for regulating liquid flows, in particular for service-water mixer valves, the silicon-carbide material comprising 70 to 90% by weight of silicon carbide and 8 to 30% by weight of silicon with a content of at most 0.2% by weight of free carbon and containing at most 0.1% by volume of closed pores, the characterizing features of the valve disk according to the invention being that it has a functional surface on which isolated islands of bearing surfaces are surrounded by a level lying lower with respect to the isolated islands, the functional surface having the following microtopographical characteristics over its entire region:

$R_a$ 0.02 to 0.80 $\mu m$, preferably 0.15 to 0.40 $\mu m$
$R_t$ 0.50 to 6.00 $\mu m$
$R_z$ 0.20 to 1.00 $\mu m$
Flatness 0.0002 to 0.01 mm
$t_{pi}$ 40 to 80% (at 0.3 $\mu m$ cut depth)
$t_{pa}$ 10 to 60% (at 0.3 $\mu m$ cut depth).

In the case of the hitherto conventional valve disks, the functional surface has an appearance in which the bearing surface is interrupted occasionally by isolated depressions. In the valve disks according to the present invention, on the other hand, it behaves in exactly the reverse manner, i.e. here it can be seen in the scanning electron microscope that the bearing surface is now in the form of isolated islands whilst, by far the greater proportion of the surface exists as a depression. Despite these special structures on the surface, the tightness of a valve fitting equipped with valve disks according to the invention is ensured.

The silicon-infiltrated silicon carbide serving for the production of the valve plates according to the invention can be prepared as specified in German Patent No. 31 16 786. The material used is preferably in its structure a SiC crystal structure with crystallite sizes in the range between 1 and 30 $\mu m$, contains at least 8% by weight of free metallic silicon, has a modulus of elasticity in the range of 300,000 to 400,000 $N/mm^2$ and a hardness in the SiC matrix of between 20,000 and 30,000 N/mm², the metallic silicon having a hardness of between 10,000 and 15,000 N/mm². A material of this kind can be obtained analogously to the details in DE 31 16 786 if, in comparison to the initial powder stated there, an initial powder is used here which is more fine grained and has a higher modulus of elasticity.

In addition, for the production of the valve disks according to the invention, CSiSiC material, which additionally contains free carbon in comparison to the SiSiC described above, can be used.

The valve disks according to the invention are manufactured using conventional processes as described in DE 31 16 786. After siliconization, the rough valve disks are ground in a conventional manner and subsequently polished in two stages using aqueous suspensions of diamond grains. In the first stage polishing is carried out with a suspension of diamond grains having an average grain diameter of approximately 3 to 6 μm. In the second stage polishing is carried out with diamond grains having an average grain size of approximately 10 to 20 μm. It is surprising that with this type of polishing, in which first finer and then coarser grains are used, valve disks are obtained having the microtopographical characteristics described above. These valve disks have lower operating torques than the valve disks according to DE 31 16 801, which are not polished in this manner.

I claim:

1. A valve disk of silicon-infiltrated silicon carbide material for control elements for regulating liquid flows, in particular for service-water mixer valves, the silicon carbide material containing 70 to 90% by weight of silicon carbide and 8 to 30% by weight of silicon with a content of at most 0.2% by weight of free carbon and containing at most 0.1% by volume of closed pores, wherein the valve disk has a functional surface in which isolated islands of bearing surfaces are surrounded by a level lying lower with respect to the isolated islands, the functional surface having the following microtopographical characteristics over its entire region:

$R_a$ 0.02 to 0.80 μm, preferably 0.15 to 0.40 μm
$R_t$ 0.50 to 6.00 μm
$R_z$ 0.20 to 1.00 μm
Flatness 0.0002 to 0.01 mm
$t_{pi}$ 40 to 80% (at 0.3 μm cut depth)
$t_{pa}$ 10 to 60% (at 0.3 μm cut depth).

2. The valve disk as claimed in claim 1, which comprises silicon-infiltrated silicon carbide having in its structure a SiC crystal structure with crystallite sizes in the range between 1 and 30 μm.

3. The valve disk as claimed in claim 1, which comprises silicon-infiltrated silicon carbide containing at least 8% by weight of free metallic silicon.

4. The valve disk as claimed in claim 1, which comprises silicon-infiltrated silicon carbide having a modulus of elasticity in the range of 300,000 to 400,000 N/mm².

5. The valve disk as claimed in claim 1, which comprises silicon-infiltrated silicon carbide with a hardness in the SiC matrix of between 20,000 and 30,000 N/mm², the hardness of the metallic silicon being between 10,000 and 15,000 N/mm².

6. The valve disk as claimed in claim 1, which comprises CSiSiC.

7. A process for manufacturing a valve disk as claimed in claim 1 in which silicon carbide is ground, dried, mixed with carbon and molding auxiliaries, shaped to form valve disks, subsequently carbonized and silicated at temperatures in the range of 1100° to 1300° C. in an inert gas atmosphere, wherein the silicated valve disk is ground and subsequently polished in two stages using aqueous suspensions of diamond grains, in the first stage polishing being carried out using a suspension of diamond grains having an average grain diameter of 3 to 6 μm, and in the second stage polishing being carried out with diamond grains having an average grain size of 10 to 20 μm.

* * * * *